(12) United States Patent
Acharya et al.

(10) Patent No.: US 8,509,831 B2
(45) Date of Patent: Aug. 13, 2013

(54) JOINT USER EQUIPMENT SCHEDULING AND CLUSTER FORMATION FOR DISTRIBUTED ANTENNA SYSTEMS

(75) Inventors: Joydeep Acharya, Sunnyvale, CA (US); Long Gao, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 39 days.

(21) Appl. No.: 12/890,886

(22) Filed: Sep. 27, 2010

(65) Prior Publication Data

US 2012/0077531 A1 Mar. 29, 2012

(51) Int. Cl.
*H04B 7/00* (2006.01)
(52) U.S. Cl.
USPC ..... 455/507; 455/562.1; 455/562; 455/575.7; 455/33.3; 455/446
(58) Field of Classification Search
None
See application file for complete search history.

(56) References Cited

U.S. PATENT DOCUMENTS

| | | | |
|---|---|---|---|
| 2004/0147227 A1* | 7/2004 | Hamalainen et al. | 455/69 |
| 2006/0276227 A1* | 12/2006 | Dravida | 455/562.1 |
| 2010/0041407 A1* | 2/2010 | Caire et al. | 455/446 |

OTHER PUBLICATIONS

J. Zhang, et al., Distributed Antenna Systems with Randomness, IEEE Transactions on Wireless Communications, vol. 7, No. 9, pp. 3636-3646, Sep. 2008.

A. Papadogiannis, et al., A Dynamic Clustering Approach in Wireless Networks with Multi-Cell Cooperative Processing, Proc. IEEE Int. Conf. Commun., May 2008, pp. 4033-4037.
http://en.wikipedia.org/wiki/Round-robin_scheduling, Sep. 27, 2010.
G. Caire, et al., Hard Fairness versus Proportional Fairness in Wireless Communications: the Single-Cell Case, IEEE Trans. on Information Theory, vol. 53, pp. 1366-1385, Apr. 2007.
S. Venkatesan, et al., Coordinating Base Stations for Greater Uplink Spectral Efficiency in a Cellular Network, Proc. IEEE PIMRC, pp. 1-5, Sep. 2007.

* cited by examiner

*Primary Examiner* — Yuwen Pan
*Assistant Examiner* — Fanghwa Wang
(74) *Attorney, Agent, or Firm* — Mattingly & Malur, PC

(57) ABSTRACT

A distributed antenna system comprises users; remote radio heads which are to be divided into clusters; and a central base station (CBS) including a CBS processor, a CBS memory, a user ordering module, and a user scheduling and cluster formation module. The user ordering module is configured to order the users in decreasing values of proportional fair scheduling metrics to provide a set of ordered users. The user scheduling and cluster formation module is configured to schedule the users according to the order of the users in decreasing values of proportional fair scheduling metrics; and for each user being scheduled according to the order of the users, pick up first N number of remote radio heads, in decreasing order of signal strength to the user being scheduled, which have not been picked up previously, to form a cluster of size N for the user being scheduled.

17 Claims, 6 Drawing Sheets

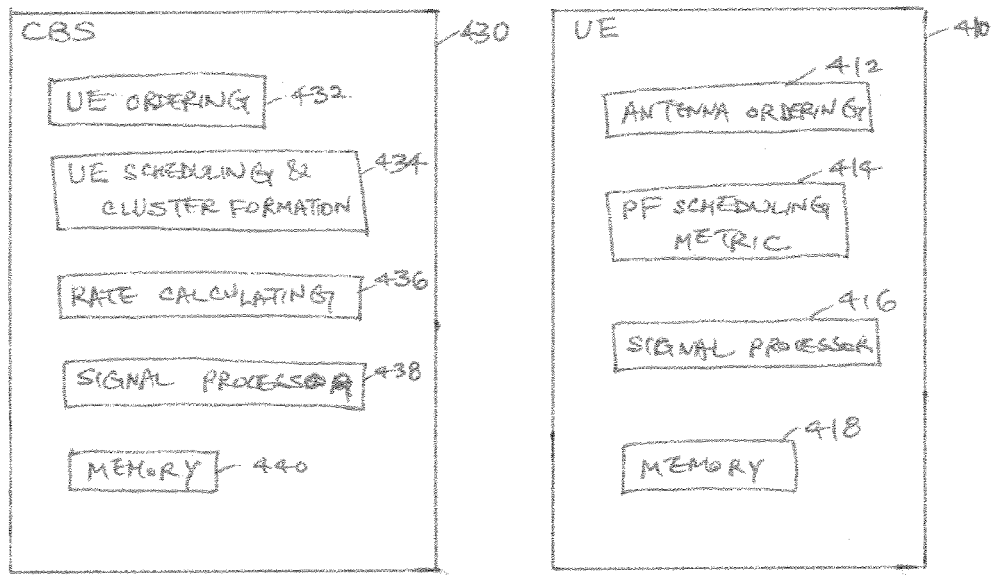

FIG. 4

| Deployment scenario | Indoor hotspot scenario |
|---|---|
| Room Size | 240 m X 240m |
| Total BS Tx power | 21 dBm for 20 MHz |
| Minimum RRH to UE distance | >= 3m |
| Carrier frequency | 3.4 GHz |
| Layout of RRHS | K X K grid of RRHs (K =2,3,4) |
| Inter-RRH distance | 60 m |
| UE distribution | 160 UEs uniformly distributed in room |
| UT noise figure | 7 dB |
| BS,UE max antenna gain | 0 dBi |
| BS antenna pattern parameters | omni |
| Simulation bandwidth | 20 + 20 MHz (FDD) |
| LoS probability | max(0.5,min(1,exp(-(d-18)/27))) |
| LoS Pathloss and shadow fading | 43.43+1.69*10*log10(d), σ = 3dB |
| Non-LoS pathloss and shadow fading | 22.13+4.33*10*log10(d), σ = 4dB |
| Small Scale Fading | iid Rayleigh fading across time and antenna |
| Scheduler | PF for all users jointly for 2000 time units |

FIG. 5

JOINT USER EQUIPMENT SCHEDULING AND CLUSTER FORMATION FOR DISTRIBUTED ANTENNA SYSTEMS

BACKGROUND OF THE INVENTION

The present invention relates generally to wireless systems and, more particularly, to joint user equipment (UE) scheduling and cluster formation for distributed antenna systems.

In a distributed antenna system (DAS), multiple distributed antennae are set up in a geographical region and are connected via fiber to a centralized Base Station (CBS) which manages these antennae. The antennae are grouped into clusters which serve users (UEs). Due to the proximity of multiple antennae, this is an interference limited region and the received throughput of user equipments such as mobiles can suffer if the system is not operated properly.

BRIEF SUMMARY OF THE INVENTION

Exemplary embodiments of the invention provide a way to operate a DAS which improves the downlink spectrum efficiency and user throughput. This is accomplished by an algorithm for joint antenna clustering and UE scheduling. Most of the existing algorithms perform these two operations separately, which is not optimal as the two operations are interdependent. On the other hand, optimal joint clustering and scheduling algorithms are very complex to implement in a practical system. This invention provides an algorithm that achieves joint optimization which is suboptimal but is simple to implement. In the proposed algorithm, the following two steps are performed at each time instant: (1) the UEs are scheduled based on proportional fair criteria, and (2) the antennae are assigned to the scheduled UE according to the received signal strength. In this way, the algorithm performs joint antenna clustering and UE scheduling, and also gives indications about choosing appropriate values for the number of antennae and cluster size in order to maximize the throughput performance of the UEs. As a result, the proposed scheme can significantly improve the spectrum efficiency and user throughput.

In accordance with an aspect of the present invention, a distributed antenna system comprises a plurality of users; a plurality of remote radio heads which are to be divided into clusters each including multiple remote radio heads; and a central base station (CBS) including a CBS processor, a CBS memory, a user ordering module, and a user scheduling and cluster formation module. The user ordering module is configured to order the users in decreasing values of proportional fair scheduling metrics to provide a set of ordered users. The user scheduling and cluster formation module is configured to schedule the users according to the order of the users in decreasing values of proportional fair scheduling metrics; and for each user being scheduled according to the order of the users, pick up first N number of remote radio heads, in decreasing order of signal strength to the user being scheduled, which have not been picked up previously, to form a cluster of size N for the user being scheduled.

In some embodiments, each user includes a user processor, a user memory, and an antenna ordering module configured to order the remote radio heads in decreasing order of signal strength to each user. Each user includes a proportional fair scheduling metric module configured to calculate proportional fair scheduling metrics for each user. The antenna ordering module is configured to order the remote radio heads in decreasing order of signal strength as vector $S(i, j)$ to each user $UE(i)$, where i equals 1 to total number of users K, and where j equals 1 to total number of remote radio heads in decreasing order of signal strength. The proportional fair scheduling metric module is configured to calculate proportional fair scheduling metrics $M_i$ for each user $UE(i)$. The user ordering module is configured to order the users in decreasing values of the calculated proportional fair scheduling metrics $M_i$ to provide a set T of ordered users from $T(1)$ to $T(K)$ as a UE index ordering the users from UE $T(1)$ to UE $T(K)$. The user scheduling and cluster formation module is configured, starting from a counter u=1, to (1) schedule user UE $T(u)$ based on the set T from $T(1)$ to $T(K)$; (2) pick up first N number of jth remote radio heads from the vector $S(T(u), j)$ which have not been picked up previously, where N is the size of the cluster to be formed; and (3) if not all users have been assigned a cluster and not all remote radio heads have been assigned to some cluster, then increment the counter u to u+1 and schedule a next UE $T(u)$ with cluster formation by repeating steps (1) to (3). Each cluster of remote radio heads has only one corresponding user. The clusters each have a same fixed size of N remote radio heads.

Another aspect of this invention is directed to a central base station in a distributed antenna system which includes a plurality of users and a plurality of remote radio heads, the remote radio heads to be divided into clusters each including multiple remote radio heads. The central base station comprises a processor; a memory; a user ordering module configured to order the users in decreasing values of proportional fair scheduling metrics to provide a set of ordered users; and a user scheduling and cluster formation module configured to schedule the users according to the order of the users in decreasing values of proportional fair scheduling metrics; and for each user being scheduled according to the order of the users, pick up first N number of remote radio heads, in decreasing order of signal strength to the user being scheduled, which have not been picked up previously, to form a cluster of size N for the user being scheduled.

Another aspect of the invention is directed to a method for user scheduling and cluster formation in a distributed antenna system which includes a central base station, a plurality of users, and a plurality of remote radio heads, the remote radio heads to be divided into clusters each including multiple remote radio heads. The method comprises: ordering the users in decreasing values of proportional fair scheduling metrics to provide a set of ordered users; and scheduling the users according to the order of users in decreasing values of proportional fair scheduling metrics; and for each user being scheduled according to the order of the users, picking up first N number of remote radio heads, in decreasing order of signal strength to the user being scheduled, which have not been picked up previously, to form a cluster of size N for the user being scheduled.

In some embodiments, ordering the users, scheduling the users, and picking up first N number of remote radio heads are performed periodically at preset time instants.

These and other features and advantages of the present invention will become apparent to those of ordinary skill in the art in view of the following detailed description of the specific embodiments.

BRIEF DESCRIPTION OF THE DRAWINGS

FIG. 4 shows an example of the functional block diagrams of a user and a central base station.

FIG. 5 is a table summarizing the various parameters for simulation of the proposed joint UE scheduling and cluster formation algorithm in a distributed antenna system.

DETAILED DESCRIPTION OF THE INVENTION

Figure 1:
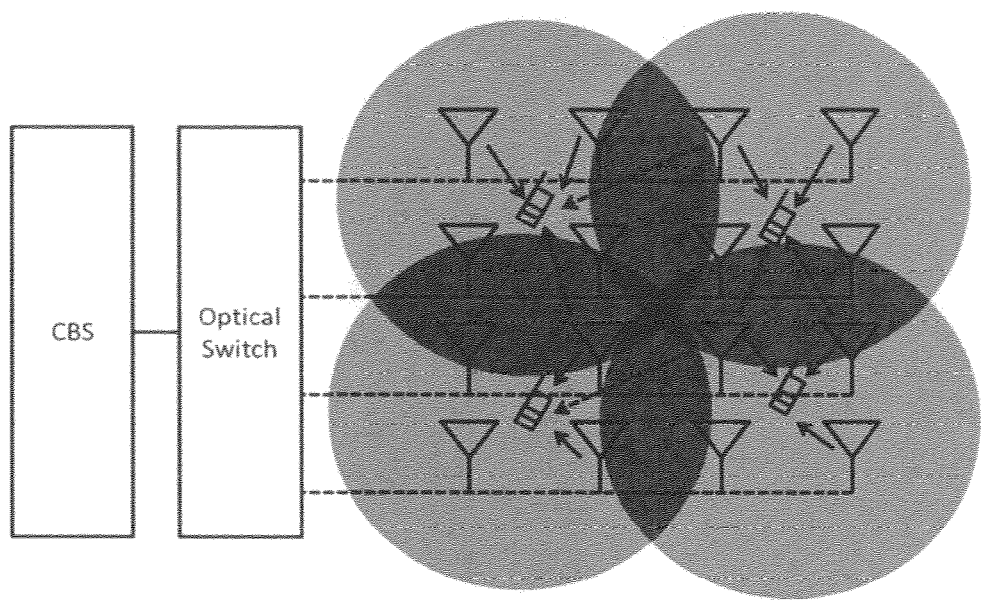
FIG. 1 shows an example of a distributed antenna system (DAS) managed by a central base station (CBS).

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for joint user equipment scheduling and cluster formation in distributed antenna systems.

A. Distributed Antenna System

FIG. 1 shows an example of a distributed antenna system (DAS) managed by a central Base Station (CBS). Multiple RRHs (remote radio heads), i.e., dummy antennae, are deployed in a distributed manner. The RRHs are controlled for packet transmissions and receptions by a CBS via an optical switch or the like. The CBS has the capability to turn the RRHs ON or OFF, and also calculates the signal that any of the RRHs has to transmit and sends this information to the RRHs. Given the fact that the number of the distributed antennae in a DAS is generally large, the antennae are divided into clusters for easy management and signaling overhead reduction. In FIG. 1, the RRHs are grouped into clusters represented by the dark circles. Each cluster includes four RRHs and one or more UEs. Each cluster of RRHs transmits to one UE or multiple UEs.

Numerous clustering schemes are proposed in the literature. Depending on whether the cluster formation (i.e., the number of antennae in each cluster) is varying over time or not, these schemes can be divided into two categories: static clustering schemes or dynamic clustering schemes.

An example of static clustering is found in J. Zhang and J. G. Andrews, "Distributed Antenna Systems with Randomness," IEEE Transactions on Wireless Communications, Vol. 7, No. 9, pp. 3636-46, September 2008, the entire content of which is incorporated herein by reference. In Zhang & Andrews, the clusters are formed based on the geographic locations of the distributed antennae, i.e., every N antennae that are close to each other form a cluster, where N is the cluster size. Once the clusters are formed, they will not change during the whole data transmission. The static schemes have several disadvantages such as edge effect (i.e., the UEs at the edge of the cluster always experience worse performance), which provides a motivation to investigate dynamic clustering schemes.

An example of dynamic clustering is disclosed in A. Papadogiannis, D. Gesbert, and E. Hardouin, "A Dynamic Clustering Approach in Wireless Networks with Multi-Cell Cooperative Processing," Proc. IEEE Int. Conf. Commun., May 2008, pp. 4033-4037, which is incorporated herein by reference in its entirety. In Papadogiannis et al., a dynamic clustering scheme is proposed to maximize the special efficiency for each clustering instance. The procedure of the dynamic clustering scheme is based on greedy algorithm, which is briefly described as follows.

Step1: Start from a random antenna that has not been chosen yet.

Step2: Find the antenna that maximizes the joint capacity with the initially selected antenna and continue in this manner until the cluster is formed.

Step 3: Go to Step 1 and repeat until all clusters are formed.

Another critical issue in DAS is the UE scheduling. Because the CBS can have the full knowledge of the DAS, a joint UE scheduling across all UEs is desired. Two well-known UE schedulers in the literature are the round-robin scheduler and the proportional fair scheduler. The round-robin scheduler is one of the simplest schedulers, which assigns resource blocks (e.g., time slots, frequency bands) to each UE in equal portions and in circular order without priority. An example of a round-robin scheduler is found in http://en.wikipedia.org/wiki/Round-robin_scheduling. An example of a proportional fair scheduler is found in G. Caire, R. Müller, and R. Knopp, "Hard Fairness Versus Proportional Fairness in Wireless Communications: The Single-cell Case," IEEE Trans. on Information Theory, Vol. 53, pp. 1366 -1385, April 2007. Caire et al. proposes a proportional fair scheduler (PFS) with the fairness consideration among UEs. The PFS schedules a UE when its instantaneous channel quality is high relative to its own average channel condition over time, i.e., it assigns resource block m to UE k if k=k̃, where $$\tilde{k} = \underset{i=1,\Lambda,K}{\operatorname{argmax}} \frac{R_i(m)}{T_i} \qquad (1)$$

where K is the total number of UEs, $R_i(m)$ is the instantaneous achievable rate of the ith UE in resource block m, and $T_i$ is the long-term average rate of the ith UE. The PFS has been applied in LTE (Long Term Evolution) cellular systems.

Cluster formation and UE scheduling can be implemented either separately (one could first perform cluster formation and then UE scheduling, or the other way around) or jointly. Some joint clustering and UE scheduling schemes have been proposed in the context of coordinate multi-point transmission (COMP) in LTE systems, which can be also used in DASs. Specifically in Sivarama Venkatesan, "Coordinating Base Stations for greater Uplink Spectral Efficiency: Proportionally fair User Rate," Proc. IEEE PIMRC, pp. 1-5, September 2007, a UE scheduling and cluster selection scheme is proposed to maximize the sum of the user rates within each cluster. This work is based on the assumption of static cluster formation, which limits further performance improvement. Furthermore, the implementation complexity of the proposed scheme in Venkatesan is quite high as all possible clusters (including overlapping clusters) are first enumerated and the UE does a brute force search to select the optimal cluster.

Figure 2:
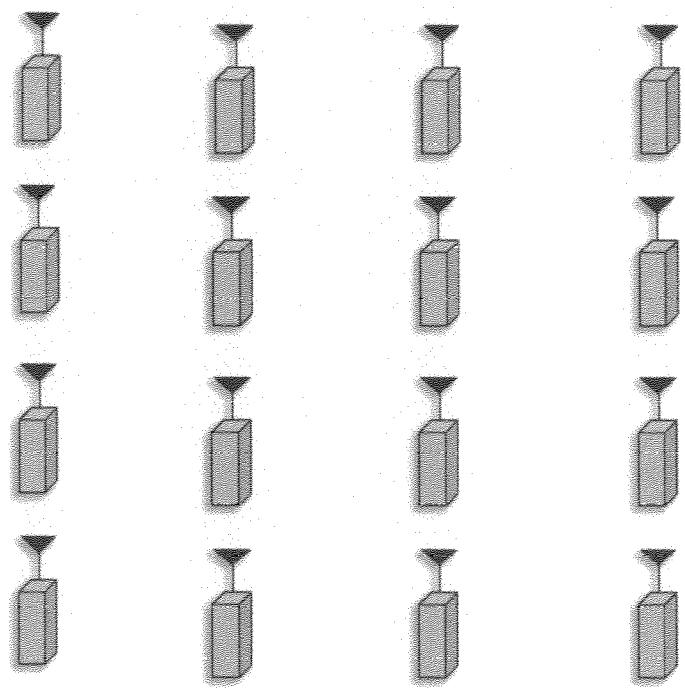
FIG. 2 shows a uniform grid of remote radio heads (RRHs) placed inside a room.

FIG. 2 shows a uniform grid of RRHs placed inside a room. As mentioned above, the grid of RRHs is assumed to be controlled by the CBS. For purposes of this discussion, we only consider the indoor case; however, the invention is not limited to the indoor case. Assume that there is a fixed number of UEs within the room. At each instant of time, there is a joint UE scheduling and RRH clustering algorithm that takes place, at the end of which, the scheduled UEs update their received bits. The details of this algorithm are provided below. In one example, this algorithm runs for 2000 time units, at the end of which, the average rates of all users are calculated.

B. Joint Scheduling and Clustering Principle

The main objective of the joint scheduling and clustering algorithm is to increase the achievable rates of the UEs at minimal implementation complexity. For this purpose we note that the twin problems of UE scheduling and RRH clustering are interdependent. The reason is that the scheduling process depends on the instantaneous rates of a UE (if scheduled) which further depends on the clustering structure. Likewise, since clusters serve UEs, they can be better formed if it is known which UEs will be active (i.e., which UEs are scheduled) in a time instant. However, most approaches in the literature attempt to either first schedule the UEs and then form the clusters or first form the clusters and then schedule the UEs. This is done because the joint optimization is hard to implement and is usually very computationally intensive. In this invention, we present a suboptimal heuristic to do the joint optimization. It is easy to compute which we believe can be easily implemented within a wireless standards framework, such as LTE.

C. Joint UE Scheduling and Cluster Formation Algorithm

Figure 3:
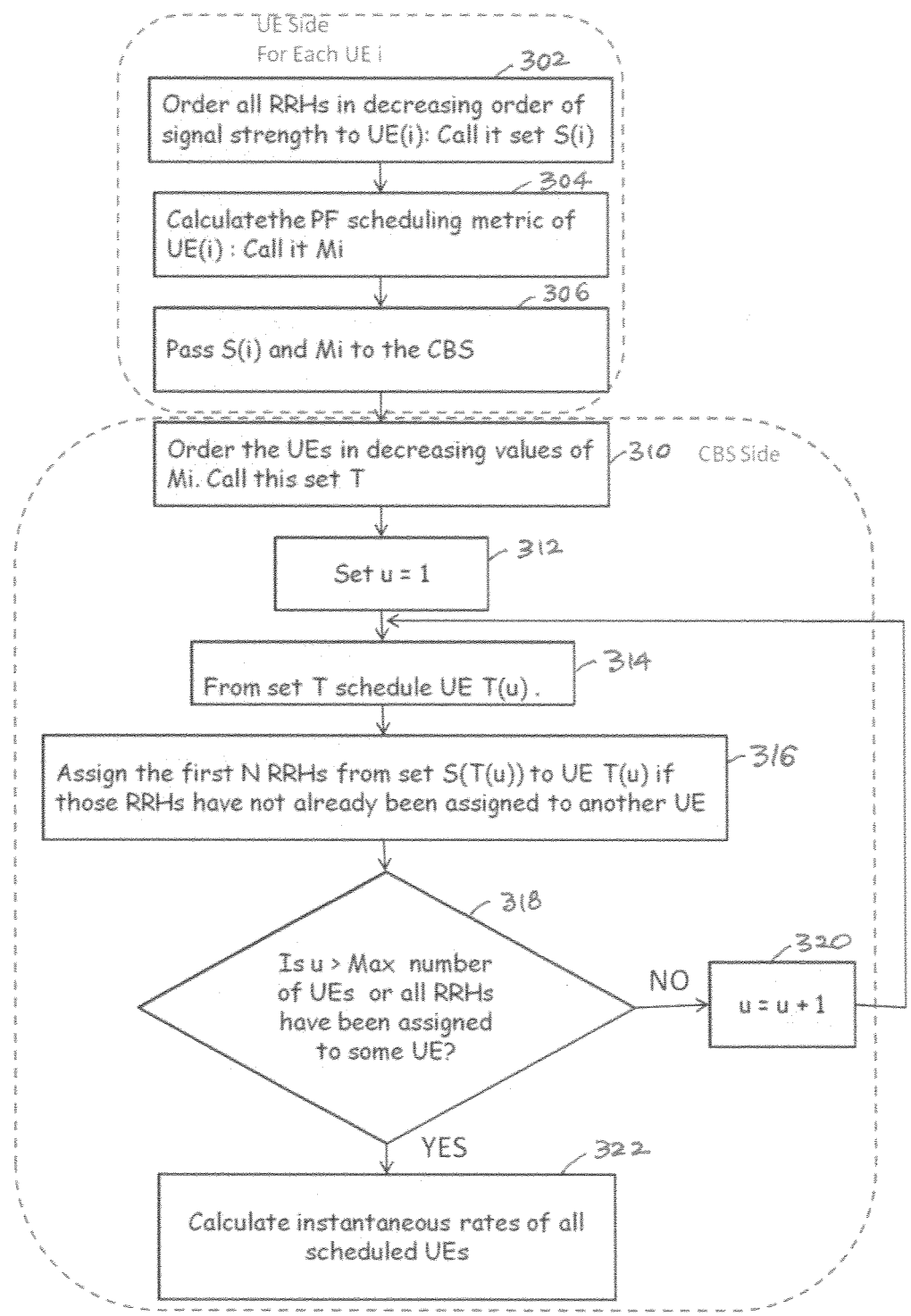
FIG. 3 shows an example of a flow diagram illustrating a joint user equipment (UE) scheduling and cluster formation algorithm.

FIG. 3 shows an example of a flow diagram illustrating a joint UE scheduling and cluster formation algorithm. In this embodiment, we consider a fixed cluster size of N RRHs per cluster, where N=KXK and K could be 2/3/4. It should be noted that any cluster size N is possible and that the specified values of 2/3/4 are used in the simulations merely to demonstrate the concept; the specific values of 2/3/4 do not limit the scope of the invention. Each RRH belongs to only one cluster and each cluster of RRHs has only one UE. These assumptions are taken for simplicity of implementation. Note that if multi-user multiple input multiple output (MU-MIMO) signal processing is used, then each cluster of RRHs could serve more than one UE.

1. In step 302, each UE orders all the RRHs in the system in terms of decreasing signal strength. For UE(i), the vector of ordered RRHs is S(i). Thus, if there are M RRHs in the system, then S(i) is the vector [S(i,1), S(i,2), . . . ,S(i,M)] for UE(i), and RRH S(i,1) has the strongest signal to UE(i), RRH S(i,2) has the next strongest signal to UE(i), and so on. This information can be presented in the form of an RRH table having UEs (i=1 to total number of UEs K) and ordered RRH S(i, j) (j=1 to M) for each UE i.

2. In step 304, each UE i calculates its PF (proportional fair) metric Mi based on its average rate received until that instant of time and the instantaneous rate it would receive if it were to be scheduled.

3. In step 306, each UE i passes the information S(i) and Mi to the CBS.

4. In step 310, the CBS forms a vector T of UEs based on their PF metrics. Note that if u1>u2, then UE T(u1) has a higher PF metric than UE T(u2) and will be scheduled before UE T(u2). For UE T(u), T(u) serves as a UE index representing an order of the UEs in decreasing values of the PF metrics.

5. In step 312, the CBS sets counter u=1. In step 314, the CBS schedules UE T(u) from the set T. The counter u maintains the number of UEs that will be scheduled. Step 314 is the UE scheduling step.

6. In step 316, the CBS looks at the RRH table of UE T(u), i.e., vector S(T(u)) and corresponding ordered RRH S(T(u), j) (j=1 to M). The CBS picks up the first N RRHs from S(T(u)) ordered RRH S(T(u), j) (j=1 to M), and forms a cluster from these N RRHs and assigns this cluster to serve UE T(u). This is the clustering step.

7. In step 318, the CBS checks if all UEs have been assigned a cluster and whether all RRHs have been assigned to some cluster. If the answer is no to both inquiries, then the CBS schedules another UE (i.e., repeating the UE scheduling step 314) by incrementing the counter u to u+1 (step 320) and repeats step 316 (i.e., repeating the clustering step). Note that when u>1, the CBS may not be able to pick the first N RRHs from table S(T(u)) as some of these RRHs may already have been assigned to UEs with higher scheduling metrics. As such, the CBS picks up the first N free RRHs from table S(T(u)), where a free RRH is the one which has not yet been assigned to any cluster. If the answer is yes to either of the two inquiries in step 318, the scheduling and clustering process stops and the CBS calculates the instantaneous rates of all scheduled UEs in step 322.

Note that, for the PF scheduler in step 304, exact calculation of the instantaneous rate (i.e., for UE i as in Equation (1)) is not possible by a UE as it depends on interference from other scheduled UEs. However, when each UE calculates its scheduling metric, it does not know which other UEs would be scheduled along with itself. Thus, in most PF algorithms, a UE estimates the value of its instantaneous rate. In the present embodiment of the invention, we assume that a scheduled UE will be served by a cluster of N RRHs that have the highest signal strength to it. For calculation of interference, it is assumed that all other interfering clusters are of size 1 RRH/cluster. Note that the joint clustering and scheduling algorithm is not limited to this particular model of PF scheduling. An example of how the PF metric is calculated is found in equation (1) above.

Let the simulation run from time, t=1, ..., T. Consider any time instant m, such that 1<m<T. The average rate of UE i till instant n is given by $T_i = R_i(1) + R_i(2) + ... + R_i(m-1)$, where $R_i(1)$ is the rate obtained by UE i in time instant 1, $R_i(2)$ is the rate obtained by UE i in time instant 2, and so on. Note that if UE had not been scheduled in some time instant, the rate in that instant is zero. In order to calculate the PF metric for time m, one has to calculate the rate $R_i(m)$ that the UE would get. Note that this is not possible to calculate a priori before the scheduling process. This is because the interference seen by UE i depends on which other UEs are scheduled. In fact, UE i may not be scheduled for transmission at all. Hence the calculation of $R_i(m)$ is an approximation of the rate the UE would get if scheduled and this approximation is used to evaluate the actual scheduling. To calculate $R_i(m)$, therefore, it is assumed that UE i is able to form a cluster with the first N RRHs from its ordered RRH table S(i). It is further assumed that all other RRHs form a single RRH cluster and transmit and use this to calculate the interference. Note that during actual transmission this may not be true since (a) a UE may not get its first N antenna from S(i) as they have been allocated to another UE with a higher scheduling metric, and (b) other interfering UEs can form a cluster to transmit to another UE. Nonetheless, this approach provides a useful indication of the rate $R_i(m)$. The PF metric Mi is then calculated as $M_i = R_i(m)/T_i$.

The proposed algorithm maintains fairness as the PF metric is used. Once a UE has been scheduled, the rate is maximized by picking up the strongest available RRHs in terms of signal strength. Note that the cluster size is fixed to N, but the algorithm is still dynamic as the exact N RRHs that form a cluster for a UE change at each time instant. This is because the scheduling orders of UEs change at each time instant.

Also note that once a UE has been scheduled, the algorithm forms the cluster based on the first N available RRHs. This approach distinguishes the algorithm from past approaches where the clusters were predetermined and the UE had to select the best cluster so as to maximize its throughput. Since given KXK RRHs, many clusters of size N can be formed (especially if overlapping clusters are considered as in the Venkatesan reference mentioned above), the UE search for the optimal cluster was computationally very intensive. In the proposed algorithm, however, there is no large number of predefined clusters, but rather the clusters are formed on the fly as UEs are scheduled.

FIG. 4 shows an example of the functional block diagrams of a user and a central base station. The UE 410 has an antenna ordering module 412 for ordering the RRHs, a PF scheduling metric module 414 for calculating the PF scheduling metrics, a signal processor 416, and a memory 418. The CBS 430 has a UE ordering module 432 for ordering the UEs, a UE scheduling and cluster formation module 434 for performing the scheduling and clustering, a rate calculating module 436 for calculating instantaneous rates of scheduled UEs, a signal processor 438, and a memory 440. The memories 418, 440 store data including, for example, signal strengths, vector S(i) of ordered RRHs, PF scheduling metrics Mi, set T, and so on.

D. Simulation Results

FIG. 5 is a table summarizing the various parameters for simulation of the proposed joint UE scheduling and cluster formation in a distributed antenna system. In addition, we assume 2 antennae per UE and 1 antenna per RRH. To understand the results of the simulations, we start with an explanation as to how interference plays a role in these systems.

Figures 6, 7:
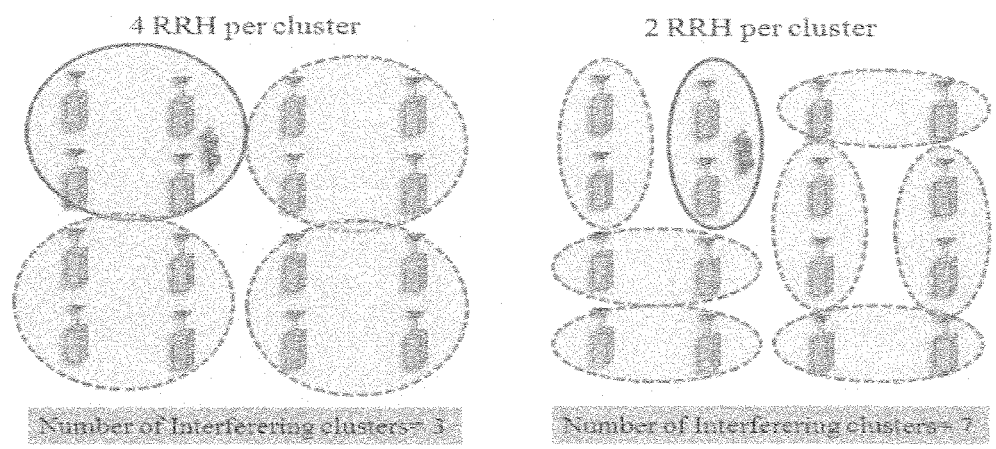
FIG. 6 shows examples of different numbers of interfering clusters for different cluster sizes to illustrate the effects of interference for a 4×4 system.
FIG. 7 is a table illustrating analysis of the inter-cluster interference for different cluster sizes.

FIG. 6 shows examples of different numbers of interfering clusters for different cluster sizes to illustrate the effects of interference for a 4×4 system. For this system, FIG. 6 shows two clustering situations, first when 4 RRHs form a cluster and second when 2 RRHs form a cluster. In each case, the cluster encircled with a solid line is the desired cluster and the other clusters are the interfering ones (which are encircled with broken lines). It is clear that as the cluster size increases, in addition to an increase in received signal strength (as there are more transmit antennae), the number of interfering clusters also reduce.

FIG. 7 is a table illustrating analysis of the inter-cluster interference for different cluster sizes. To understand the table, recall that the maximum number of independent streams in a NXM MIMO system is min (N, M). In this case, the number of receive antenna N is 2 (by assumption each UE has 2 antenna), while the number of transmit antenna M is the cluster size. Thus, for both 2×2 and 2×4 systems, only 2 streams are sent. However, there is some power gain in the 2×4 system over the 2×2 system. With this insight, we can see in the table of FIG. 7 that the number of interfering streams reduce as the cluster size increases. This indicates an increase in rate with an increase in cluster size. However, as the cluster size increases, leading to a smaller number of clusters, fewer UEs are scheduled in each time instant. Therefore, over a time period, a UE gets scheduled a fewer number of times when the cluster size increases. This leads to a decrease in the average rate. Accordingly, there is an opposing effect as the cluster size increases. Simulation studies will show which effect dominates for a given situation.

Figure 8:
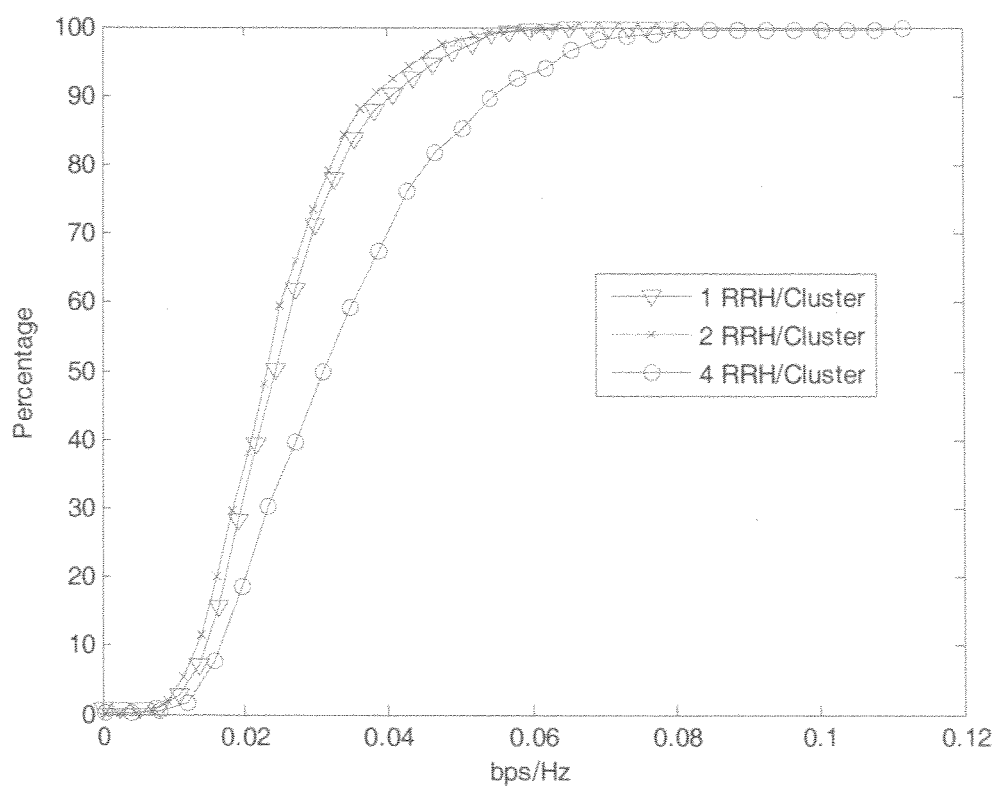
FIG. 8 shows the average rate CDFs (cumulative distribution functions) for 4×4 RRH deployment with cluster sizes of 1, 2, and 4.
Figure 9:
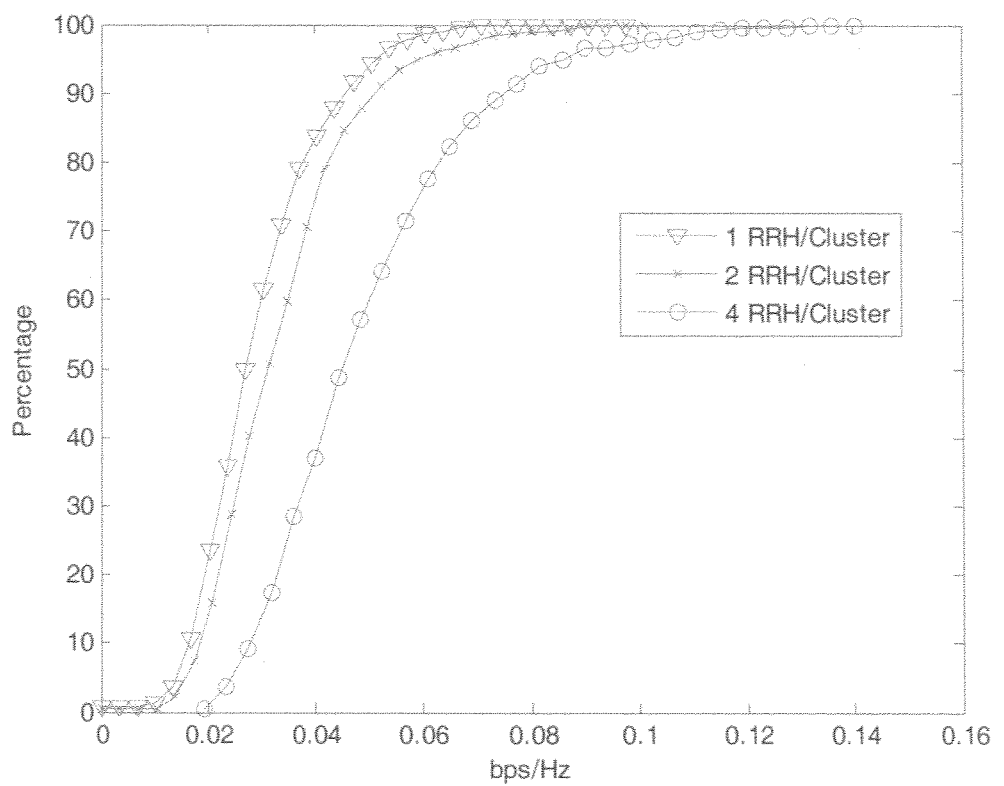
FIG. 9 shows the average rate CDFs for 3×3 RRH deployment with cluster sizes of 1, 2, and 4.

FIG. 8 shows the average rate CDFs (cumulative distribution functions) for 4×4 RRH deployment with cluster sizes of 1, 2, and 4. FIG. 9 shows the average rate CDFs (cumulative distribution functions) for 3×3 RRH deployment with cluster sizes of 1, 2, and 4. We see that for each case, increasing the cluster size helps in producing better spectral efficiencies. Performance improves for the 3×3 systems as there is less interference. This highlights the interference limited nature of these systems. For 4×4 systems, we see that going from cluster size 1 to 2 decreases the performance as each UE is scheduled less. This is an example of the tradeoff discussed above.

The proposed joint UE scheduling and cluster formation algorithm gives indications for choosing the optimal RRH deployment and also the optimal cluster size for a given deployment. Note that the simulation results are specific for an indoor case with parameters given in the table of FIG. 5. For different environments (indoor, outdoor), the channel conditions, RRH spacing, and number of users change. Nonetheless, one can use the proposed joint scheduling and clustering framework to calculate the optimal parameters for any system.

This invention provides a joint clustering and UE scheduling scheme in distributed antenna systems. This scheme could also be applied to future cellular systems with base station coordination. Both these scenarios are mentioned in the LTE-Advanced standard of cellular communications. The joint clustering and scheduling scheme of this invention can lead to efficient operation of these systems.

Of course, the distributed antenna system shown in FIG. 1 and the functional block diagram illustrated in FIG. 5 are purely exemplary of systems in which the present invention may be implemented, and the invention is not limited to a particular hardware or software configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for interference management in distributed antenna systems. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A distributed antenna system comprising:
a plurality of users;
a plurality of remote radio heads which are to be divided into clusters each including multiple remote radio heads; and
a central base station (CBS) including a CBS processor, a CBS memory, a user ordering module, and a user scheduling and cluster formation module;
wherein the user ordering module is configured to order the users in decreasing values of proportional fair scheduling metrics to provide a set of ordered users; and
wherein the user scheduling and cluster formation module is configured to schedule the plurality of users according to the order of the users in decreasing values of proportional fair scheduling metrics; and for each user being scheduled according to the order of the plurality of users, pick up first N number of remote radio heads, in decreasing order of signal strength to the user being scheduled, which have not been picked up previously to form another cluster for another user, to form a cluster of size N for the user being scheduled, wherein the scheduling of the plurality of users and picking up of remote radio heads for each user being scheduled are performed over a period of time having a plurality of time instants, according to the order of the plurality of users at the plurality of time instants, wherein each cluster of remote radio heads has only one corresponding user.

2. The distributed antenna system according to claim 1, wherein each user includes a user processor, a user memory, and an antenna ordering module configured to order the remote radio heads in decreasing order of signal strength to each user.

3. The distributed antenna system according to claim 2,
wherein each user includes a proportional fair scheduling metric module configured to calculate proportional fair scheduling metrics for each user.

4. The distributed antenna system according to claim 3,
wherein the antenna ordering module is configured to order the remote radio heads in decreasing order of signal strength as vector S(i, j) to each user UE(i), where i equals 1 to total number of users K, and where j equals 1 to total number of remote radio heads in decreasing order of signal strength; and
wherein the proportional fair scheduling metric module is configured to calculate proportional fair scheduling metrics Mi for each user UE(i).

5. The distributed antenna system according to claim 4,
wherein the user ordering module is configured to order the users in decreasing values of the calculated proportional fair scheduling metrics Mi to provide a set T of ordered users from T(1) to T(K) as a UE index ordering the users from UE T(1) to UE T(K); and
wherein the user scheduling and cluster formation module is configured, starting from a counter u=1, to
(1) schedule user UE T(u) based on the set T from T(1) to T(K);
(2) pick up first N number of jth remote radio heads from the vector S(T(u), j) which have not been picked up previously, where N is the size of the cluster to be formed; and
(3) if not all users have been assigned a cluster and not all remote radio heads have been assigned to some cluster, then increment the counter u to u+1 and schedule a next UE T(u) with cluster formation by repeating steps (1) to (3).

6. The distributed antenna system according to claim 1,
wherein the clusters each have a same fixed size of N remote radio heads.

7. A central base station in a distributed antenna system which includes a plurality of users and a plurality of remote radio heads, the remote radio heads to be divided into clusters each including multiple remote radio heads, the central base station comprising:
a processor;
a memory;
a user ordering module configured to order the users in decreasing values of proportional fair scheduling metrics to provide a set of ordered users; and
a user scheduling and cluster formation module configured to schedule the plurality of users according to the order of the users in decreasing values of proportional fair scheduling metrics; and for each user being scheduled according to the order of the plurality of users, pick up first N number of remote radio heads, in decreasing order of signal strength to the user being scheduled, which have not been picked up previously to form another cluster for another user, to form a cluster of size N for the user being scheduled, wherein the scheduling of the plurality of users and picking up of remote radio heads for each user being scheduled are performed over a period of time having a plurality of time instants, according to the order of the plurality of users at the plurality of time instants, wherein each cluster of remote radio heads has only one corresponding user.

8. The central base station according to claim 7,
wherein the remote radio heads are ordered in decreasing order of signal strength as vector S(i, j) to each user UE(i), where i equals 1 to total number of users K, and where j equals 1 to total number of remote radio heads in decreasing order of signal strength; and
wherein the proportional fair scheduling metrics Mi are calculated for each user UE(i).

9. The central base station according to claim 8,
wherein the user ordering module is configured to order the users in decreasing values of the calculated proportional fair scheduling metrics Mi to provide a set T of ordered users from T(1) to T(K) as a UE index ordering the users from UE T(1) to UE T(K); and
wherein the user scheduling and cluster formation module is configured, starting from a counter u=1, to
(1) schedule user UE T(u) based on the set T from T(1) to T(K);
(2) pick up first N number of jth remote radio heads from the vector S(T(u), j) which have not been picked up previously, where N is the size of the cluster to be formed; and
(3) if not all users have been assigned a cluster and not all remote radio heads have been assigned to some cluster, then incrementing the counter u to u+1 and schedule a next UE T(u) with cluster formation by repeating steps (1) to (3).

10. The central base station according to claim 7,
wherein the clusters each have a same fixed size of N remote radio heads.

11. A method for user scheduling and cluster formation in a distributed antenna system which includes a central base station, a plurality of users, and a plurality of remote radio heads, the remote radio heads to be divided into clusters each including multiple remote radio heads, the method comprising:
ordering the users in decreasing values of proportional fair scheduling metrics to provide a set of ordered users; and
scheduling the plurality of users according to the order of users in decreasing values of proportional fair scheduling metrics; and
for each user being scheduled according to the order of the plurality of users,
picking up first N number of remote radio heads, in decreasing order of signal strength to the user being scheduled, which have not been picked up previously to form another cluster for another user, to form a cluster of size N for the user being scheduled;
wherein the scheduling of the plurality of users and picking up of remote radio heads for each user being scheduled are performed over a period of time having a plurality of time instants, according to the order of the plurality of users at the plurality of time instants; and
wherein each cluster of remote radio heads has only one corresponding user.

12. The method according to claim 11,
wherein ordering the users, scheduling the users, and picking up first N number of remote radio heads are performed by the central base station.

13. The method according to claim 11, further comprising:
ordering the remote radio heads in decreasing order of signal strength as vector S(i, j) to each user UE(i), where i equals 1 to total number of users K, and where j equals 1 to total number of remote radio heads in decreasing order of signal strength; and
calculating the proportional fair scheduling metrics Mi for each user UE(i).

14. The method according to claim 13,
wherein ordering the remote radio heads and calculating the proportional fair scheduling metrics are performed by each user.

15. The method according to claim 13,
wherein the user are ordered in decreasing values of the calculated proportional fair scheduling metrics Mi to provide a set T of ordered users from T(1) to T(K) as a UE index ordering the users from UE T(1) to UE T(K); and
wherein scheduling the users and picking up first N number of remote radio heads to form a cluster of size N for the user being scheduled comprise, starting from a counter u=1,
(1) scheduling user UE T(u) based on the set T from T(1) to T(K);
(2) picking up first N number of jth remote radio heads from the vector S(T(u), j) which have not been picked up previously, where N is the size of the cluster to be formed; and
(3) if not all users have been assigned a cluster and not all remote radio heads have been assigned to some cluster, then incrementing the counter u to u+1 and scheduling a next UE T(u) with cluster formation by repeating steps (1) to (3).

16. The method according to claim 11,
wherein ordering the users, scheduling the users, and picking up first N number of remote radio heads are performed periodically at preset time instants.

17. The method according to claim 11,
wherein the clusters each have a same fixed size of N remote radio heads.

* * * * *